(12) United States Patent
Siegel et al.

(10) Patent No.: US 9,898,741 B2
(45) Date of Patent: Feb. 20, 2018

(54) REAL TIME ANALYTICS SYSTEM

(71) Applicant: VISA INTERNATIONAL SERVICE ASSOCIATION, San Francisco, CA (US)

(72) Inventors: Kevin Siegel, Mountain View, CA (US); Zhongxiao Jiang, Cupertino, CA (US); Chuck Byce, Mill Valley, CA (US); Mayrose Kragas, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 321 days.

(21) Appl. No.: 14/334,504

(22) Filed: Jul. 17, 2014

(65) Prior Publication Data
US 2015/0026061 A1 Jan. 22, 2015

Related U.S. Application Data

(60) Provisional application No. 61/847,512, filed on Jul. 17, 2013.

(51) Int. Cl.
*G06Q 40/00* (2012.01)
*G06Q 20/40* (2012.01)

(52) U.S. Cl.
CPC ................ *G06Q 20/4016* (2013.01)

(58) Field of Classification Search
CPC .................................. G06Q 20/4016
USPC ........................................ 705/44
See application file for complete search history.

(56) References Cited

U.S. PATENT DOCUMENTS

| 5,819,226 | A | * | 10/1998 | Gopinathan | G06Q 20/00 705/44 |
| 7,403,922 | B1 | * | 7/2008 | Lewis | G06Q 10/0635 705/35 |
| 8,589,285 | B2 | | 11/2013 | Monk | |
| 2009/0287837 | A1 | * | 11/2009 | Felsher | G06F 19/322 709/229 |
| 2012/0030083 | A1 | * | 2/2012 | Newman | G06Q 40/00 705/35 |

(Continued)

OTHER PUBLICATIONS

"Staging an application in Windows Azure," Product Data Sheet [online]. WindowsAzure Microsoft 2013, [retrieved on Oct. 27, 2014], retrieved from the internet <URL: http://www.windowsazure.com/en-us/develop/net/common-tasks/staging-deployment/>, 6 pages.

*Primary Examiner* — Hani M Kazimi
*Assistant Examiner* — Paul R Kloberg
(74) *Attorney, Agent, or Firm* — Kilpatrick Townsend & Stockton LLP

(57) ABSTRACT

Improved real-time analytics systems are provided. An analytics system may be used to generate transaction scores for transactions. A method may comprise receiving a scoring request associated with a transaction, sending the scoring request to a plurality of scoring models including a production model, wherein each scoring model is operable to generate a transaction score in response to the scoring request, and wherein each scoring model may be implemented using a virtual machine, receiving a transaction score generated by the production model, and sending the transaction score to a server for approval or denial the transaction.

19 Claims, 8 Drawing Sheets

(56) References Cited

U.S. PATENT DOCUMENTS

2012/0226613 A1* 9/2012 Adjaoute ............... G06Q 40/02
                                                   705/44
2013/0298244 A1* 11/2013 Kumar .................... G06F 21/52
                                                   726/25

* cited by examiner

REAL TIME ANALYTICS SYSTEM

CROSS-REFERENCES TO RELATED APPLICATIONS

The present application is a non-provisional application of and claims priority to U.S. Provisional Application No. 61/847,512, filed on Jul. 17, 2013, the entire contents of which are hereby incorporated by reference for all purposes.

BACKGROUND OF THE INVENTION

Payment transaction fraud continues to be a concern for consumers, merchants, payment processors, and issuers. One technique for evaluating a risk of fraud in a transaction involves analyzing the transaction to determine a transaction score as the transaction is processed (i.e., in real-time). The transaction score may indicate, for example, the likelihood that the transaction is fraudulent. In some systems, transactions with a transaction score above a defined threshold may be declined.

Although real-time analytics systems may be used to effectively detect fraud, such systems may have shortcomings. For example, updating a system with a new scoring model may be labor-intensive and require downtime (e.g., to shut down the system, load a new scoring model, and restart the system). In addition, some systems may not support evaluating a test version of the model on real-time data, which may make it difficult to determine the effectiveness or performance of a model before it is put into production.

Embodiments of the present invention address these problems and other problems individually and collectively.

BRIEF SUMMARY OF THE INVENTION

Embodiments of the invention relate to improved real-time analytics systems. In some embodiments, an analytics system may be used to generate transaction scores for transactions.

One embodiment of the invention discloses a method comprising receiving a scoring request associated with a transaction, sending the scoring request to a plurality of scoring models including a production model, wherein each scoring model is operable to generate a transaction score in response to the scoring request, and wherein each scoring model is implemented using a virtual machine, receiving a transaction score generated by the production model, and sending the transaction score to a server to approve or decline the transaction in real-time.

One embodiment of the invention discloses a transaction analytics system. The transaction analytics system comprises a processor and a non-transitory computer-readable storage medium, comprising code executable by the processor for implementing a method comprising receiving a scoring request associated with the transaction, sending the scoring request to a plurality of scoring models including a production model, wherein each scoring model is operable to generate a transaction score in response to the scoring request, and wherein each scoring model is implemented using a virtual machine, receiving a transaction score generated by the production model, and sending the transaction score to a server to approve or decline the transaction in real-time.

DETAILED DESCRIPTION OF THE INVENTION

Figure 1:
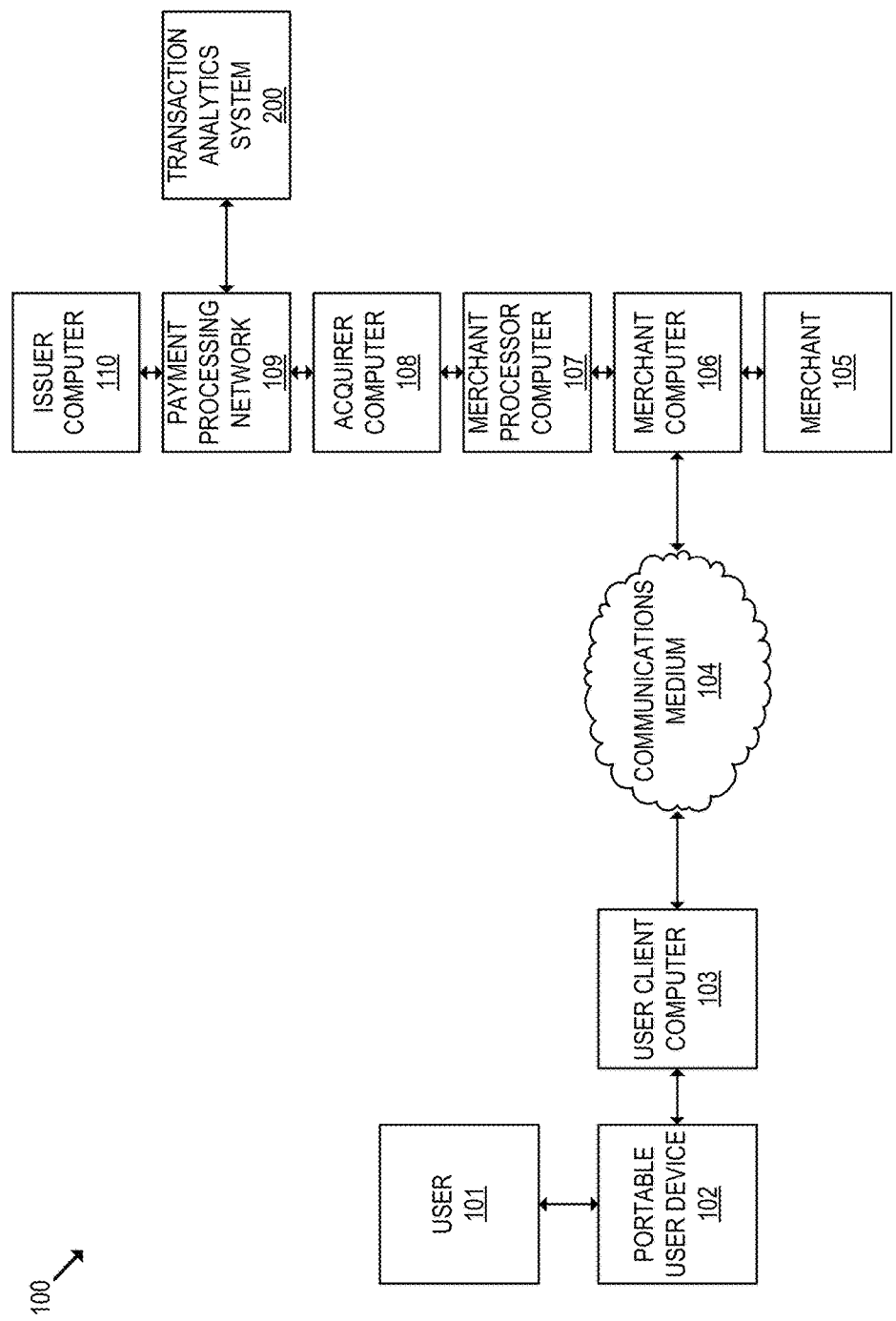
FIG. 1 shows an example of a system that may be used with some embodiments of the invention.

Embodiments of the invention relate to improved real-time analytics systems. In some embodiments, an analytics system may be used to generate transaction scores for transactions. Before discussing specific embodiments of the invention, it may be helpful to discuss some terms.

A "model" may include any suitable computer-implemented method, process, or function operable to analyze a request comprising input values and determine an appropriate output value. For example, in some embodiments of the invention, a "scoring model" may be used to determine a fraud score by combining various transaction data (e.g., the amount of the transaction, the location, etc.) using a formula, classifier, or algorithm. In various embodiments of the invention, a model may be implemented using a virtual machine, network service, or any other suitable combination of software and hardware. For example, a scoring model may be executed on a virtual machine configured with an API to receive scoring requests and return a corresponding fraud score. An "environment" may include the context in which a model is used, and may also affect how the output of the model is used. Some examples of environments are production environments, testing environments, and development environments. An analytics system may have zero, one, or more of any type of environment.

A "production environment" may include any environment wherein the model output is used to respond to requests as part of a production or running system. For example, a scoring model in a production environment may be used to determine the outcome of a payment transaction (i.e., whether it is accepted or declined). A model in a production environment may be called a "production model."

A "testing environment" may include any environment wherein the model output is not used to respond to requests, but whose output may be stored or evaluated for testing purposes. For example, a testing environment may be used to score transactions, but the score may be logged and saved to a database (e.g., a testing database) rather than being sent as a response to a request. A model in a testing environment may be referred to as a "testing model." Typically, a testing model may be a model that is stable and generally effective, but may not be thoroughly tested. In some cases, a testing model may be "promoted" to a production model if it is determined to have superior performance.

A "development environment" may include any environment wherein the model output is not used to respond to requests, but may be stored or evaluated for development purposes. A model in a development environment may be referred to as a "development model." In some cases, a development model may be a model in early stages of design and construction, so that the model may not be stable or effective. Development models may often be modified by analysts or other parties in order to improve performance.

A "client identifier" may include any data or other identifier suitable to identify a client, segment, group or other entity (e.g., an issuer) associated with a scoring request to an analytics system. A client identifier may be used to determine which environment a model is associated with for a scoring request. For example, for some client identifiers, a first model may be associated with a production environment, whereas for other client identifiers the first model may be associated with a development environment. Thus, a first issuer computer can receive scores from one model, and a second issuer computer can receives scores from a different model.

A "transaction score" may include any quantitative or qualitative metric relating to a transaction. For example, a "fraud score" may be a transaction score indicating the likelihood that a transaction is fraudulent. In some cases, a fraud score may be a number between 0 and 100, wherein a higher number indicates a higher likelihood of fraud.

Embodiments of the invention may provide several advantages. For example, embodiments can enable multiple scoring models to be tested and developed on real-time data concurrently. Testing on real-time data allows for a better determination of the scalability and reliability of a model. For example, if a model is tested on archived data, it may not be known whether the model will be able to process incoming transactions at a sufficient rate for a production system. In contrast, by testing scoring models in real-time, embodiments enable the scalability and reliability of a model to be determined before deploying the model to a production environment.

In addition, emerging usage and fraud trends may cause a model that performs well on archived data to perform poorly on new data. However, since models in embodiments of the invention may be developed and tested in the same system that is used for the production environment, a well-performing model in testing is likely to also be well-performing in production.

Furthermore, embodiments of the invention enable seamlessly transitioning a model between environments. For example, in some embodiments, production, testing, and development models may run as interchangeable virtual machines, each in a corresponding environment. A scoring request may be sent to all three environments concurrently using a service request API. For example, a first virtual IP address may correspond to the production model, and a second virtual IP address may correspond to the testing model. To promote the testing model to production, and vice versa, the first and second IP addresses may be swapped. Thus, a model may be moved to a production environment instantly and without downtime.

The seamless transition of models between environments also enables the most suitable model to be automatically used in a production environment. For example, embodiments of the invention may use model performance data to automatically determine the best performing model in any environment. The best performing model may then be promoted to the production environment. Thus, embodiments of the system can adapt to rapidly changing trends by promoting the model best suited for current trends.

Embodiments of the invention provide the further advantage of enabling a model to correspond to different environments depending on a client identifier. For instance, it may be desirable allow issuers to choose specific models to score transactions associated with the issuer. A first issuer may, for example, prefer to choose a conservative model (i.e., a model wherein the false positive rate is low), whereas a second issuer may prefer to choose an aggressive model (i.e., a model wherein the false positive rate is higher but the true positive rate is higher than the conservative model), and a third issuer may prefer to choose a highly accurate model but that is not very stable (e.g., so it may crash unexpectedly). Further, each issuer may also desire to monitor the performance of models they do not use for production scoring (e.g., to determine whether to switch to another model). By associating models with environments (e.g., a production environment or testing environment) depending on the client identifier, embodiments of the invention allow multiple issuers to score transactions using the same transaction analytics system despite using different production models. Additionally, since a model that is not used for production scoring may be moved to a testing or development environment, embodiments allow multiple issuers to monitor the models that they are not using as production models.

I. Systems

Embodiments of the invention may be implemented in the context of a financial transaction processing system. Therefore, prior to discussing improved real-time analytics systems, a brief description of transaction processing will be presented.

FIG. 1 shows an exemplary system 100 for transaction processing. The system 100 includes a user 101, a portable user device 102, a user client computer 103, a communications medium 104, a merchant 105, a merchant computer 106, a merchant processor computer 107, an acquirer computer 108, a payment processing network 109, a transaction analytics system 200, and an issuer computer 110. Each of entities 101-110 and 200 may be implemented using one or more computers.

In a typical transaction, a user 101 may purchase goods or services at a merchant 105 associated with a merchant computer 106 using a portable user device 102. The transaction details are then sent to the merchant processor computer 107 and to the acquirer computer 108. The acquirer computer 108 can communicate with an issuer computer 110 via a payment processing network 109 for transaction processing. The issuer computer 110 may approve or decline the transaction depending, for example, on a transaction score provided by transaction analytics system 200.

For simplicity of illustration, a certain number of components are shown in FIG. 1. It is understood, however, that embodiments of the invention may include more than one of each component. In addition, some embodiments of the invention may include fewer than all of the components shown in system 100. The components shown in system 100 may communicate via any suitable communication medium (such as the internet), using any suitable communication protocol.

The user client computer 103 may communicate with the merchant computer 106 via a communications medium 104, such as a network (e.g., the Internet).

The user 101 may be an individual or an organization (e.g., a business) that is capable of purchasing goods or services. The merchant 105 may represent a merchant, merchant employee, merchant device, or other entity that interfaces with merchant computer 106.

The user 101 can use the user client computer 103, which is communicatively coupled to the merchant computer 106 via the communications medium 104 in order to conduct a transaction with the merchant 105. The user client computer 103 may be in any suitable form. Example of user client computers 103 include any device capable of accessing the Internet, such as a personal computer, cellular or wireless phones, personal digital assistants (PDAs), tablet PCs, and handheld specialized readers. The user client computer 103 transmits data through the communications medium 104 to the merchant computer 106. In some embodiments of the invention, the portable user device 102 and the user client computer 103 may be a single device.

In some embodiments of the invention, a payment processing network 109 may communicate with a transaction analytics system 200. The payment processing network 109 may send information regarding a transaction to the transaction analytics system 200 and receive a transaction score, such as a fraud score, from the transaction analytics system 200. In some embodiments, the payment processing network 109 and/or issuer computer 110 may also use the received transaction scores to approve, decline, or otherwise perform actions on other transactions.

It should be noted that although FIG. 1 shows one possible embodiment of a payment system 100, embodiments may include fewer than, more than, and/or a rearrangement of the entities shown. For example, in some embodiments, transaction analytics system 200 can be integrated with issuer computer 110, acquirer computer 108, merchant processor computer 107, and/or another entity.

Figure 2:
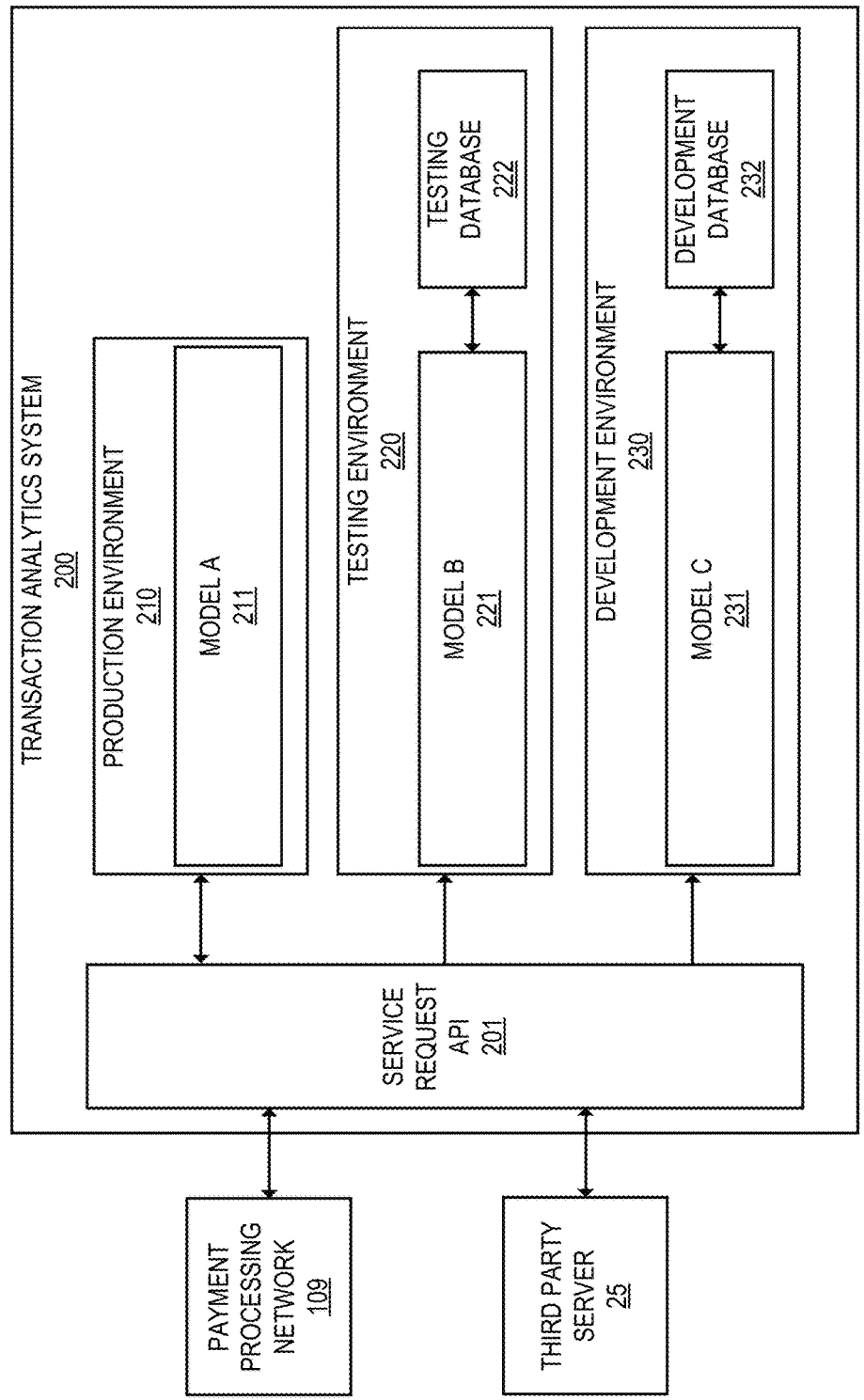
FIG. 2 illustrates an example of a transaction analytics system.

FIG. 2 illustrates an example of a transaction analytics system 200. Transaction analytics system 200 comprises a service request API 201 and a plurality of environments 210, 220, and 230. Each of environments 210, 220, and 230 comprises a scoring model 211, 221, and 231, respectively.

Service request API 201 may be any suitable API, protocol, or other interface suitable for receiving scoring requests from a payment processing network 109, third party server 25, or another entity, and sending a transaction score for the transaction to the requesting or another entity. Third party server 25 may be issuer computer 110, acquirer computer 108, merchant computer 106, or any other suitable entity. Scoring requests may comprise, for example, transaction data, a segment identifier, or any other suitable data. In various embodiments of the invention, service request API may use JSON, XML, serialized objects, or any other suitable object notation, and may use any suitable access paradigm (such as SOAP or REST).

Service request API 201 may further be configured to determine which environments are production, testing, and/or development environments for a received client identifier. For example, in some embodiments, service request API 201 may maintain a database (not shown) associating each of a plurality of client identifiers with a mapping between models and environments for that client identifier. Thus, when a scoring request including a client identifier is received, the client identifier may be cross-referenced with the database to determine which models correspond to which environments. As shown in FIG. 2, model A 211 corresponds to production environment, model B 221 corresponds to testing environment 220, and model C 231 corresponds to development environment 230. However, in other cases (e.g., for other client identifiers), models A-C 211, 221, and 231 may correspond to different environments. Once the models corresponding to the environments are determined, service request API may replicate and forward the scoring request, including transaction data, to each model.

Production environment 210 may include any production environment operable to determine a fraud score for a transaction, such that the score is returned in response to a scoring request. Production environment 210 may comprise a model A 211 that may be used in the production environment 210 to score transactions. In the shown embodiment, production environment 210 is linked to service request API 201 with a double-sided arrow, indicating that a fraud score determined by model A 211 may be sent to service request API 201 to be transmitted to payment processing network 26, third party server 25, or any other suitable entity.

Testing environment 220 may include any testing environment operable to determine a fraud score for a transaction, such that the score is saved for later review or performance analysis. Testing environment 220 may comprise a model B 221 that may be used in the testing environment 220 to score transactions. In the shown embodiment, a fraud score determined by model B 221 may be stored in testing database 222.

Development environment 230 may include any development environment operable to determine a fraud score for a transaction, such that the score is saved for development purposes. Development environment 230 may comprise a model C 231 that may be used in the development environment 230 to score transactions. In the shown embodiment, a fraud score determined by model C 231 may be stored in development database 232.

It should be noted that FIG. 2 is intended to be descriptive but not limiting. For example, in some embodiments of the invention, some environments may comprise multiple models. For example, the production environment 210, testing environment 220, and development environment 230 may each comprise a plurality of models, each of which processes the scores in accordance with the corresponding environment. Further, in some embodiments, transaction analytics system 200 may have greater or fewer than the environments shown in FIG. 2. For instance, transaction analytics system 200 may have multiple production, testing, and/or development environments. For example, transaction analytics system 200 may comprise a first development environment that stores data into a first development database, and a second development environment that stores data into a second development database.

In some embodiments, transaction analytics system 200 may be deployed using a cloud service provider such as Amazon EC2, Windows Azure, etc. In such embodiments, the scoring models 211, 221, and 231 may be implemented as virtual machines (VMs), and the databases 222 and 232 may be implemented as virtual databases. In such embodiments, each of the scoring models may 211, 221, and 231 may implement a defined, uniform API to receive scoring requests and return a corresponding transaction score. Thus, externally, all scoring models may be interchangeable, so that the movement of models between environments may be performed with little to no latency and downtime.

Further, in some embodiments, the API implemented by the scoring models may be network-based (e.g., accessible a network address). In some such embodiments, transaction analytics system 200 may assign virtual IP addresses to each of the models, wherein each of virtual IP addresses may also be associated with an environment. Thus, the virtual IP address of a model may determine the destination of the score generated by that model. For example, a production model 211 may have a first virtual IP address that causes the score generated by the model to be sent to a third party server 25 such as an issuer. In another example, a testing model 221 may have a second virtual IP address that causes the score generated by the testing model to be sent to a testing database 222. In some embodiments, a virtual IP address swap or other change may be used to move a scoring model between environments (e.g., to promote a model to a production environment or to demote a model to a testing or development environment). Accordingly, a virtual IP address swap may be used to control which transaction score is returned in response to a scoring request (e.g., to payment processing network 109 or to third party server 25).

Figure 3:
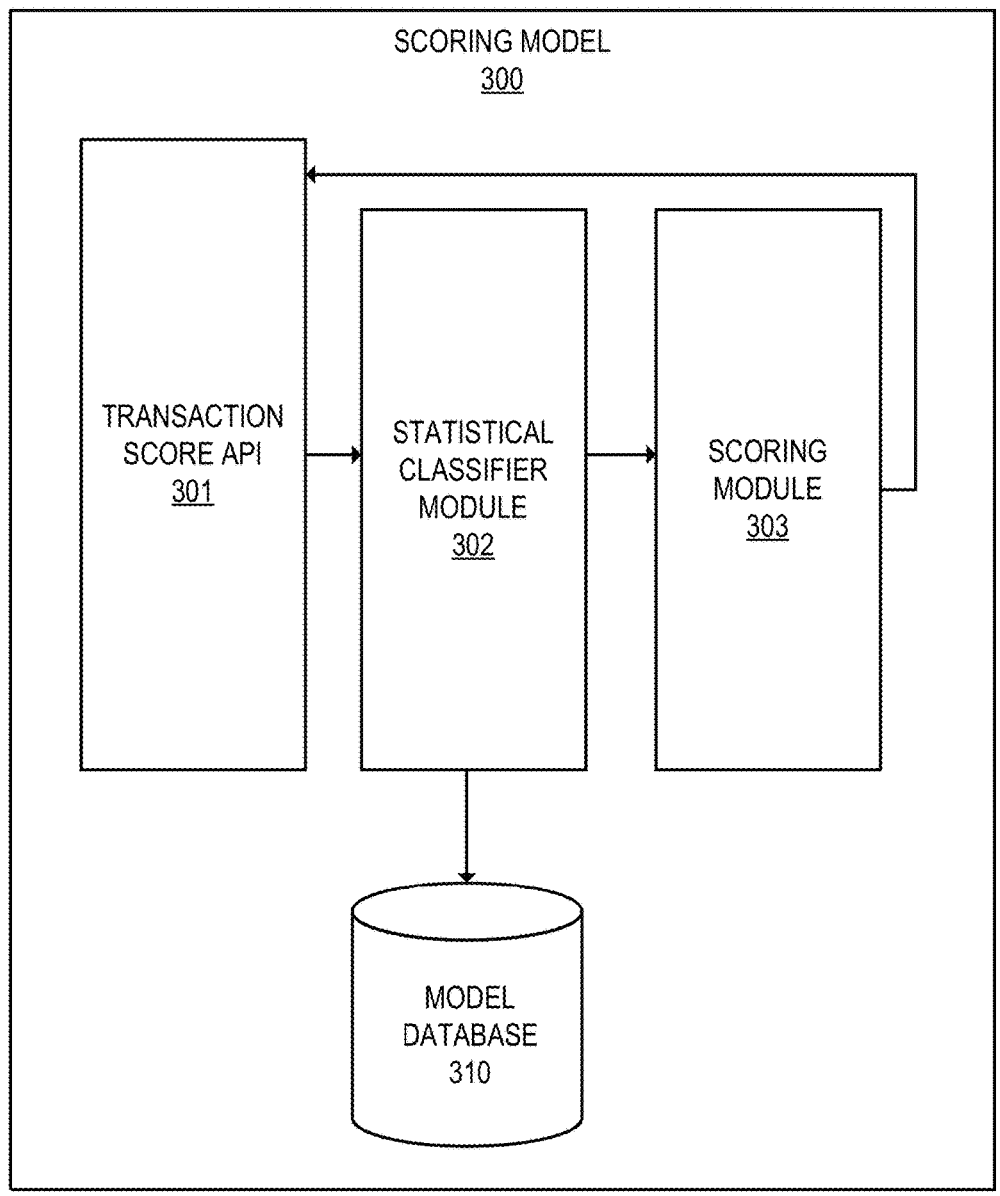
FIG. 3 illustrates an example of a scoring model.

FIG. 3 shows an example of a scoring model 300 in accordance with some embodiments of the invention. As shown in FIG. 3, scoring model 300 may comprise a transaction score API 301, a statistical classifier module 302, a scoring module 303, and a model database 310. Each of elements 301-303 and 310 may be implemented using any suitable combination of hardware and software. For example, in some embodiments, scoring model 300 may be implemented as a virtual machine (VM) running in a hypervisor or virtual machine monitor (VMM). In some embodiments, the VM may be running in a cloud computing platform.

Transaction score API 301 may comprise any interface suitable to receive transaction data and output a transaction score generated by the scoring model 300. For example, in some embodiments, transaction score API 301 may be associated with a network service, wherein service request API 201 may interface with scoring model 300 using transaction score API 301. For instance, service request API 201 may send an HTTP request to scoring model 300 using transaction score API 301.

Statistical classifier module 302 may be configured to analyze transaction data to determine a statistical classification of the transaction. The statistical classification may be performed using any suitable method, such as a Bayesian classifier, a decision tree, a support vector machine, or any other suitable classification method. In various embodiments, the classification of the transaction may be categorical (e.g., fraudulent and non-fraudulent), ordinal (e.g., high, medium, low), integer-valued or real-valued (e.g., a numeric score), or in any other suitable format.

In some embodiments, statistical classifier module 302 may utilize model database 310. For example, in embodiments where statistical classifier module 302 implements a Bayesian classifier, model database 310 may include the conditional probability of a classification based on one or more variables.

Scoring module 303 may be configured to use the classification determined by statistical classifier module 302 to determine a transaction score. For example, in some embodiments, the classification determined by statistical classifier module 302 may be normalized to an integer number between 0 and 100.

II. Methods

Figure 4:
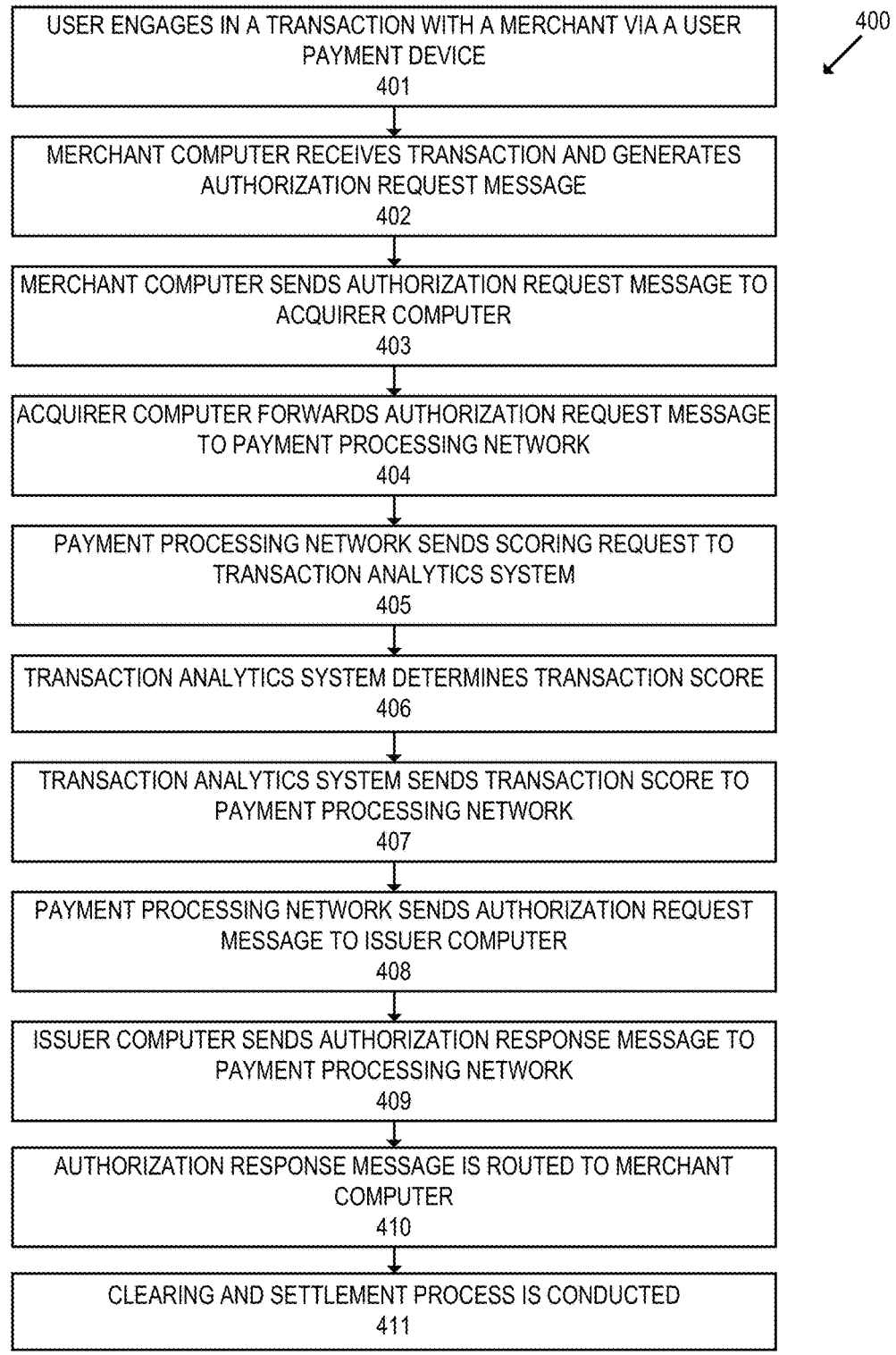
FIG. 4 shows a method of conducting a financial transaction in accordance with some embodiments.

FIG. 4 shows a method 400 for conducting a transaction in accordance with some embodiments of the invention. As shown in method 400, a transaction analytics system 200 may be used to determine a transaction score for a transaction, and the transaction score may be used to approve or decline the transaction.

At step 401, a user 101 engages in a transaction with a merchant 105 using a portable user device 102 such as a credit card or mobile phone. For example, the user 101 may use their Internet-enabled mobile phone to access a merchant website to conduct a transaction using their portable user device 102.

At step 402, merchant computer 106 receives the transaction and generates an authorization request message for the transaction. The authorization request message may be generated in any suitable format.

An "authorization request message" may include an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the device (e.g., an access device such as a merchant computer 106) that generated the authorization request message, information about the location of the device, etc.

At step 403, merchant computer 106 sends the authorization request message to acquirer computer 108. The authorization request message may be transmitted in any suitable format. In some embodiments, the authorization request message may be transmitted via merchant processor computer 107.

At step 404, acquirer computer 108 then forwards the authorization request message to payment processing network 109.

At step 405, payment processing network 109 sends a scoring request for the transaction to transaction analytics system 200. In some embodiments, the scoring request may include transaction data relating to the transaction (e.g., data included in the authorization request message), a client identifier (e.g., an issuer identifier, user identifier, etc.), or any other suitable data.

Figure 5:
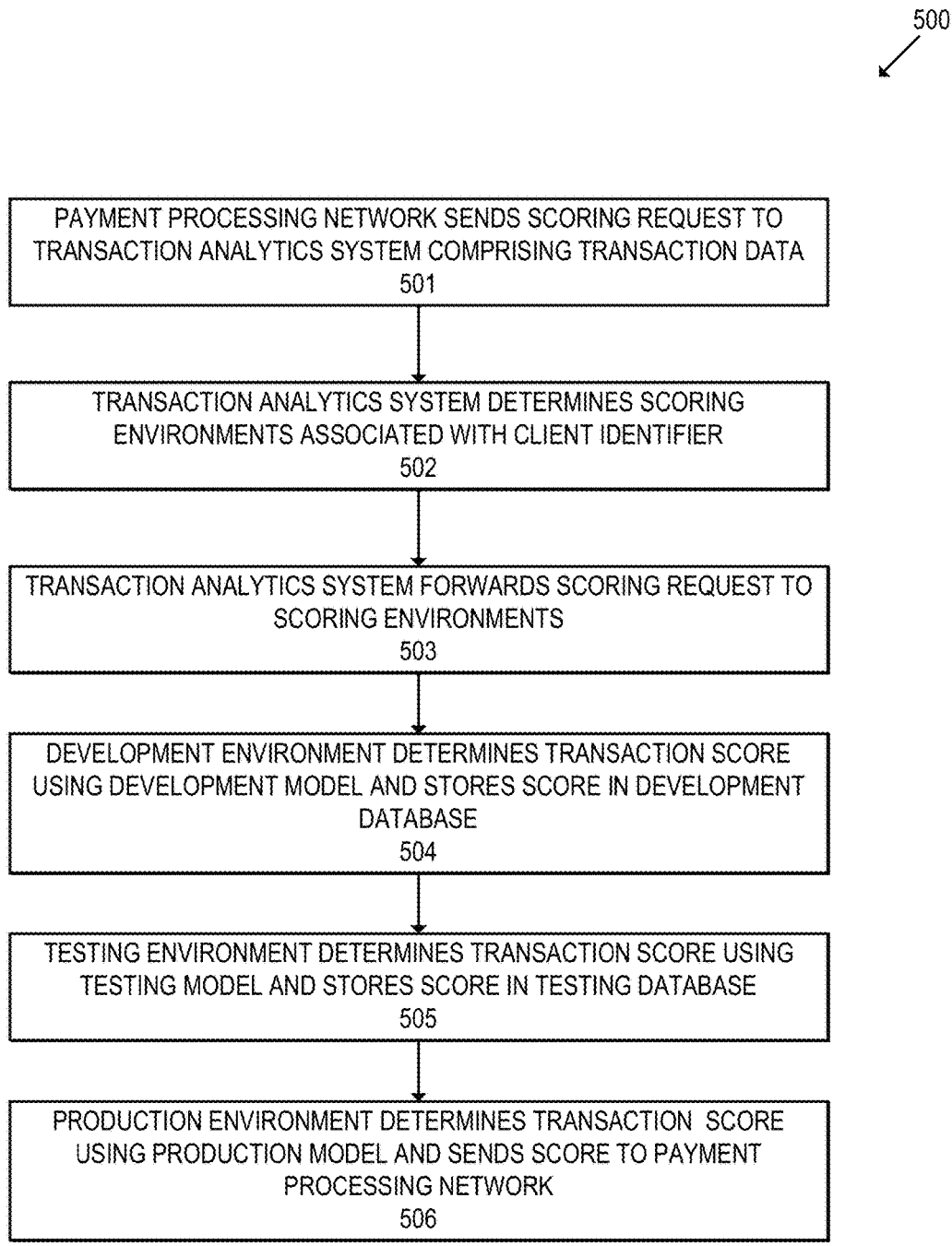
FIG. 5 shows a method of scoring a transaction in accordance with some embodiments.

In some embodiments, the scoring request may be transmitted to transaction analytics system 200 in accordance with method 500 as shown in FIG. 5.

At step 406, transaction analytics system 200 determines a transaction score corresponding to the scoring request of step 405. Typically, the transaction score determine may correspond to the score determined by production model 211 of transaction analytics system 200. At step 407, transaction analytics system 200 sends the determined transaction score to payment processing network 109.

At step 408, payment processing network 109 includes the transaction score in the authorization request message, and sends the authorization request message to issuer computer 110 associated with portable user device 102.

At step 409, issuer computer 110 receives the authorization request message. Issuer computer 110 may then determine whether the transaction should be authorized. Issuer computer 110 then transmits an authorization response message back to payment processing network 109. The authorization response message can indicate whether or not the transaction has been approved or declined.

An "authorization response message" may include an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

In some embodiments, the transaction score determined by transaction analytics system 200 may be a factor in determining whether or not the transaction is approved. For example, in some cases, issuer computer 110 and/or payment processing network 109 may establish a threshold value for transactions, so that if a transaction score has a value below the threshold, it is declined. Otherwise, the transaction may be approved. In some embodiments, the transaction score may be used in combination with other data, such as a fraud score calculated at issuer computer 110, the presence of a suspicious activity flag placed on the account conducting the transaction, or any other suitable data.

At step 410, the authorization response message is routed to merchant computer 106. For example, in some embodiments, the authorization response message may be sent to merchant computer 106 via one or more of acquirer computer 108 or merchant processor computer 107. After the merchant computer 110 receives the authorization response message, the merchant computer 110 may then provide the authorization response message to the consumer 102. For example, the consumer 102 may be presented with a screen on the consumer client computer 106 indicating success or failure of authorization. In other embodiments, the authorization response message may be displayed by the POS terminal, or may be printed out on a receipt.

At step 411, at the end of the day or at a period determined by the merchant, a normal clearing and settlement process can be conducted. A clearing and settlement process may include a process of reconciling a transaction. A clearing process is a process of exchanging financial details between an acquirer computer 122 and an issuer computer 110 to facilitate posting to a party's account and reconciliation of the party's settlement position. Settlement involves the delivery of securities from one party to another. In some embodiments, clearing and settlement can occur simultaneously. In other embodiments, the clearing and settlement process can be conducted by the fraud detection system 118 once the fraud detection system 118 has determined that the transaction should be accepted. Subsequent to the clearing and settlement process, the merchant 105 receives payment for the transaction.

It should be noted that method 400 as described above is intended to be illustrative and not limiting. For example, although method 400 describes payment processing network 109 as sending a scoring request to transaction analytics system 200 to obtain a transaction score for a transaction, it should be appreciated that any other suitable entity, such as merchant computer 106, merchant processor computer 107, acquirer computer 108, or issuer computer 110, may communicate with transaction analytics system 200 to obtain a transaction score for a transaction. Further, any of entities 106-110 may perform an action (e.g., approving or declining a transaction) based on the transaction score.

FIG. 5 shows a method 500 of scoring a transaction in accordance with some embodiments. In some embodiments, method 500 may be performed after an authorization request message for a transaction is received by payment processing network 109 or issuer computer 110, such as at step 406 of method 400.

At step 501, payment processing network 109 sends a scoring request to transaction analytics system 200 comprising transaction data. Transaction data may comprise the amount of the transaction, the date and time of the transaction, a consumer associated with the transaction, a geographic location of the transaction, a recent transaction velocity, or any other suitable data. In some embodiments, payment processing network 109 may send the scoring request using service request API 201. In some embodiments, the scoring request may also comprise a client identifier. For example, in some embodiments, the client identifier may relate to the issuer associated with the user 101 conducting the transaction, or may relate to user 101 specifically.

At step 502, if a client identifier is included in the scoring request, transaction analytics system 200 determines scoring environments associated with the client identifier. Determining the scoring environments may include determining which models correspond to which environments. For example, as shown in FIG. 2, model A 211 may correspond to production environment 210, model B 221 may correspond to testing environment 220, and model C 231 may correspond to development environment 230. However, in other cases (e.g., for different client identifiers), models A-C 211, 221, and 231 may correspond to different environments.

At step 503, transaction analytics system 200 forwards the scoring request to the scoring environments. For example, for the transaction analytics system 200 shown in FIG. 2, the scoring request may be forwarded to the production environment 210, testing environment 220, and development environment 230. Forwarding the scoring request may comprise replicating the scoring request and the included transaction data for each environment.

At step 504, the development environment 230 determines a transaction score for the transaction using development model C 231 and stores the transaction score in development database 232.

Similarly, at step 505, testing environment 220 determines a transaction score for the transaction using testing model B 221 and stores the transaction score in testing database 222.

At step 506, production environment 210 determines a transaction score for the transaction using production model A 211 and sends the transaction score to payment processing network 109 in response to the scoring request. In some embodiments, the response may be sent using service request API 201.

In one example of method 500, payment processing network 109 sends a scoring request for a high-value transaction from a suspicious location. At step 502, the models corresponding to development, testing, and production environments are determined based on a client identifier. At step 503, the transaction analytics system 200 forwards the scoring request to each environment. At step 504, development model C 231 may crash, causing the error to be recorded in development database 232. At step 505, testing model B 221 may score the transaction '70', and the score may be stored in testing database 222. At step 506, production model A 211 may score the transaction '95', and the score may be returned to payment processing network 109. Since a score of '95' indicates a high chance of fraud, typically payment processing network 109 or issuer computer 110 may decline the transaction.

It should be understood that FIG. 5 is intended to be descriptive and non-limiting. For example, transaction analytics system 200 may forward the scoring request to any number of scoring environments, and each scoring environment may utilize the resulting transaction score in any suitable manner.

Figure 6:
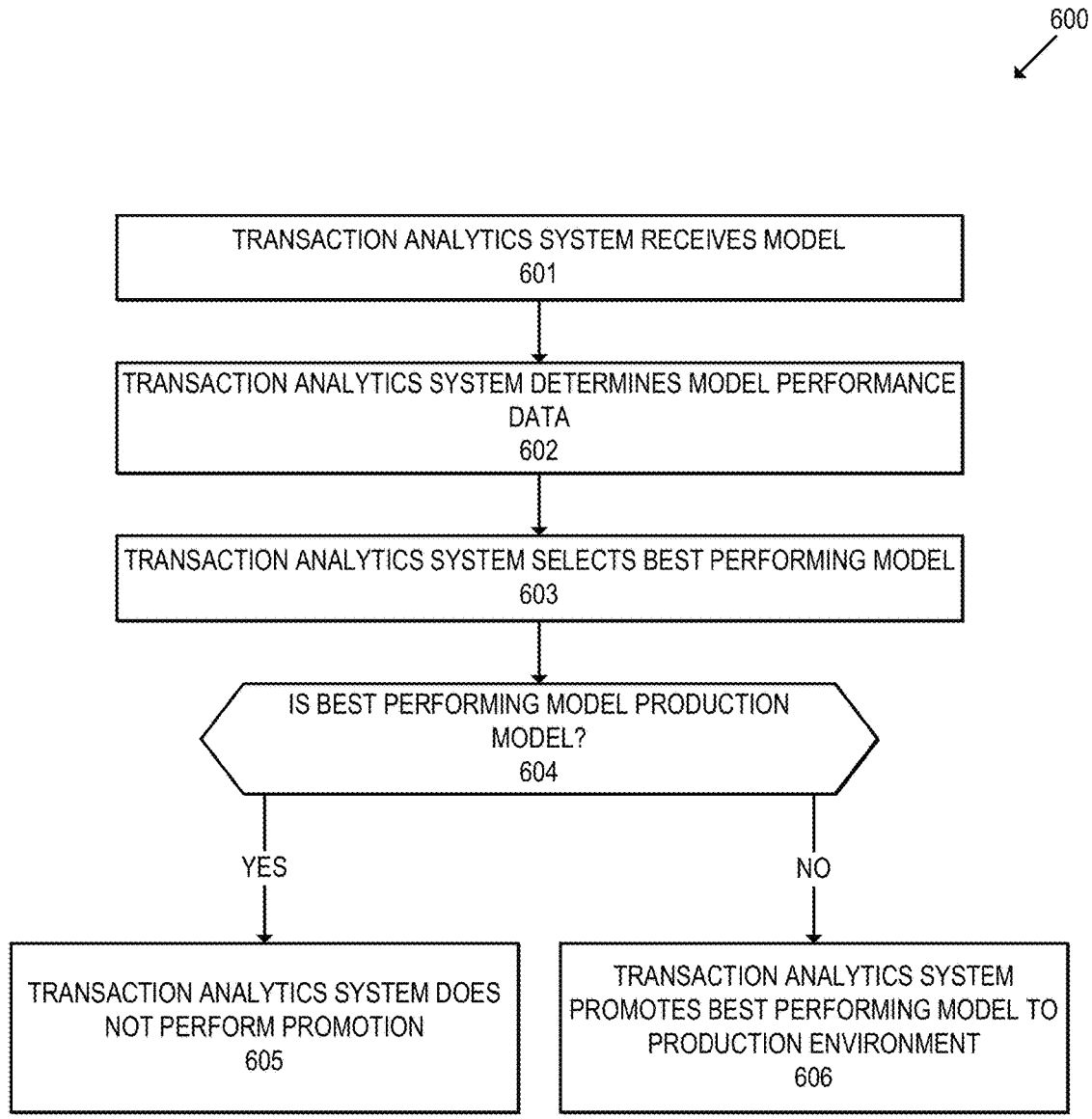
FIG. 6 shows a method of promoting a scoring model in accordance with some embodiments.

FIG. 6 shows a method 600 of promoting a scoring model in accordance with some embodiments. In some embodiments, the method of FIG. 6 may be run periodically or at regular intervals (e.g., once every 14, 30, 60, 90 days, etc.) in order to promote a well-performing non-production model to a production environment. In other embodiments, Promoting effective models to a production environment may improve the quality or performance of transaction score generation by transaction analysis system 200.

At step 601, transaction analysis system 200 receives a new model. The new model may be generated and/or sent by any person, computing device, or other entity that defines or generates scoring models. For example, the model may be defined by a an employee or system associated with payment processing network 1009 or issuer 110 that is configured to analyze fraud trends and determine effective models for determining the likelihood of fraud for a transaction, or by an algorithm (e.g., a machine learning algorithm). In some embodiments of the invention, a model may be a virtual machine configured with an API to receive scoring requests and return a corresponding transaction score. In such embodiments, the model may be uploaded (e.g., using a virtual machine migration service). In other embodiments, the model may be implemented to interface with a platform as a service (PaaS).

At step 602, transaction analysis system 200 determines model performance data for the models in each environment. Model performance data may include any data relating to the efficiency, effectiveness, or desirability of the model. For example, model performance data may include the speed at which the model runs, the predictive accuracy of the model (e.g., to what extent a high transaction score correlates with a fraudulent transaction, and vice versa), false positive/false negative rates for declined transactions, the stability of the model, etc.

In one example, model performance data may be generated by evaluating the transaction score for 90 day old transactions. Since 90 day old transactions will likely be marked by the user 101 or issuer 110, the transaction score generated at the time of the transaction can be compared to the final disposition of the transaction to determine the extent to which the determined transaction score is consistent with the disposition of the transaction.

In the above example, a true positive may refer to a transaction with a high transaction score that was also determined to be fraudulent. A true negative may be a transaction with a low transaction score that was also determined to be non-fraudulent. A false positive may be a transaction with a high transaction score that was determined to be non-fraudulent. A false negative may be a transaction with a low transaction score that was determined to be fraudulent. The false positive and negative rates may be used to determine the predictive accuracy of a model.

In another example, model performance data may be generated evaluating the speed of the model. For example, metrics may include the number of transactions analyzed per hour or the amount of memory and CPU time used per transaction.

In some embodiments, the performance data may also be used to update existing models. In one example, a model may be based upon a naïve Bayesian classifier. In order to implement the classifier, conditional probability data (e.g., the probability of fraud under certain conditions) may be stored for the model, such as in model database 310. When true positive, true negative, false positive, and false negative performance data is determined for the model, the performance data may be used to update the conditional probability data used to implement the classifier. Thus, in some embodiments, performance data may be used to update models in addition to evaluating their performance.

At step 603, transaction analysis system 200 determines the best performing model. Typically, the best performing model will have the best combination of model performance data. For example, the best performing model may have the most desirable combination of predictive effectiveness and speed. The best performing model may be selected using any suitable method, such as algorithmically or through human inspection.

At conditional step 604, transaction analysis system 200 determines if the best performing model is already the production model. If yes, then at step 605, transaction analysis system 200 does not perform any promotion. However, if the best performing model is not already a production model, at step 606 the model is promoted to the production environment. Since in some embodiments, models may be interchangeable virtual machines, promotion may simply involve modifying an IP address or other pointer at the production environment or in a database to indicate the best performing model instead of the previous production model. Thus, the model used in the production environment may be switched with no downtime and minimal latency. Subsequent responses to scoring requests will use the best performing model.

In one example in accordance with the transaction analysis system 200 shown in FIG. 2., at step 601 an analyst sends a model C 231 to the transaction analysis system 200. Since model C 231 is untested at first, it is kept in the development environment 230. However, at step 602 model C 231 is determine to exhibit many desirable properties, such as effective prediction of fraud and low computing resource usage. At step 603, it is determined that model C 231 is the best performing model (as compared to model A 211 and model B 221). Thus, at step 606, transaction analysis system 200 promotes model C 231 to the production environment 210. Model A 211 may be demoted to testing environment 220 or development environment 230. Thus, if a new scoring request is transmitted to transaction analysis system 200, the score generated by model C 231 may be returned.

In addition, it should be noted that in various embodiments, aspects of method 600 may be performed for any promotion or demotion of models between any environment.

It should be noted that the embodiments of the invention may be used for models other than scoring models. For example, embodiments of the invention may generally be applied to marketing analysis models, merchant service models, or any other suitable model.

III. Computer Apparatuses

Figure 7:
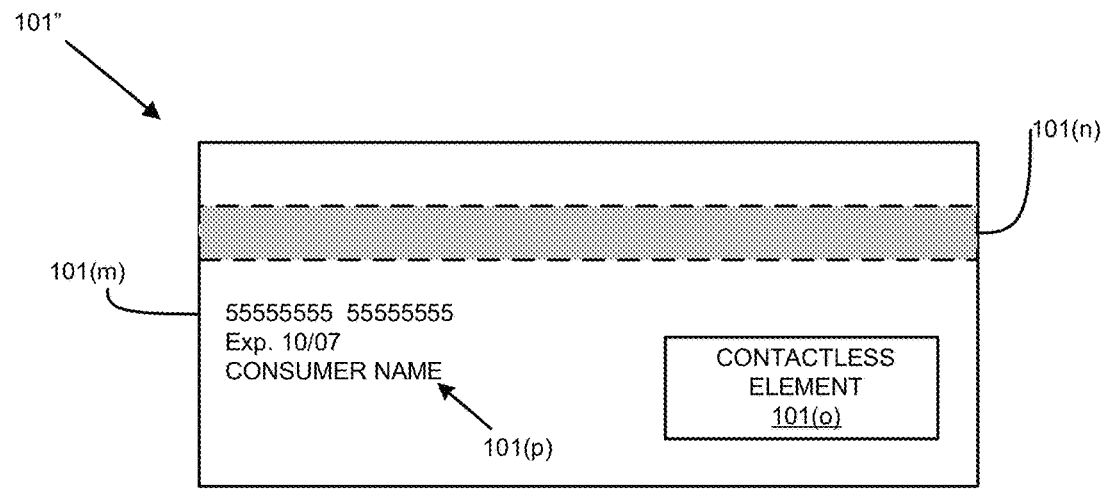
FIG. 7 shows an example of a portable user device.

FIG. 7 shows an example of a payment device 101" in the form of a card. As shown, the payment device 101" comprises a plastic substrate 101(*m*). In some embodiments, a contactless element 101(*o*) for interfacing with an access device 102 may be present on, or embedded within, the plastic substrate 101(*m*). User information 101(*p*) such as an account number, expiration date, and/or a user name may be printed or embossed on the card. A magnetic stripe 101(*n*) may also be on the plastic substrate 101(*m*). In some embodiments, the payment device 101" may comprise a microprocessor and/or memory chips with user data stored in them.

As noted above and shown in FIG. 7, the payment device 101" may include both a magnetic stripe 101(*n*) and a contactless element 101(*o*). In some embodiments, both the magnetic stripe 101(*n*) and the contactless element 101(*o*) may be in the payment device 101". In some embodiments, either the magnetic stripe 101(*n*) or the contactless element 101(*o*) may be present in the payment device 101".

Figure 8:
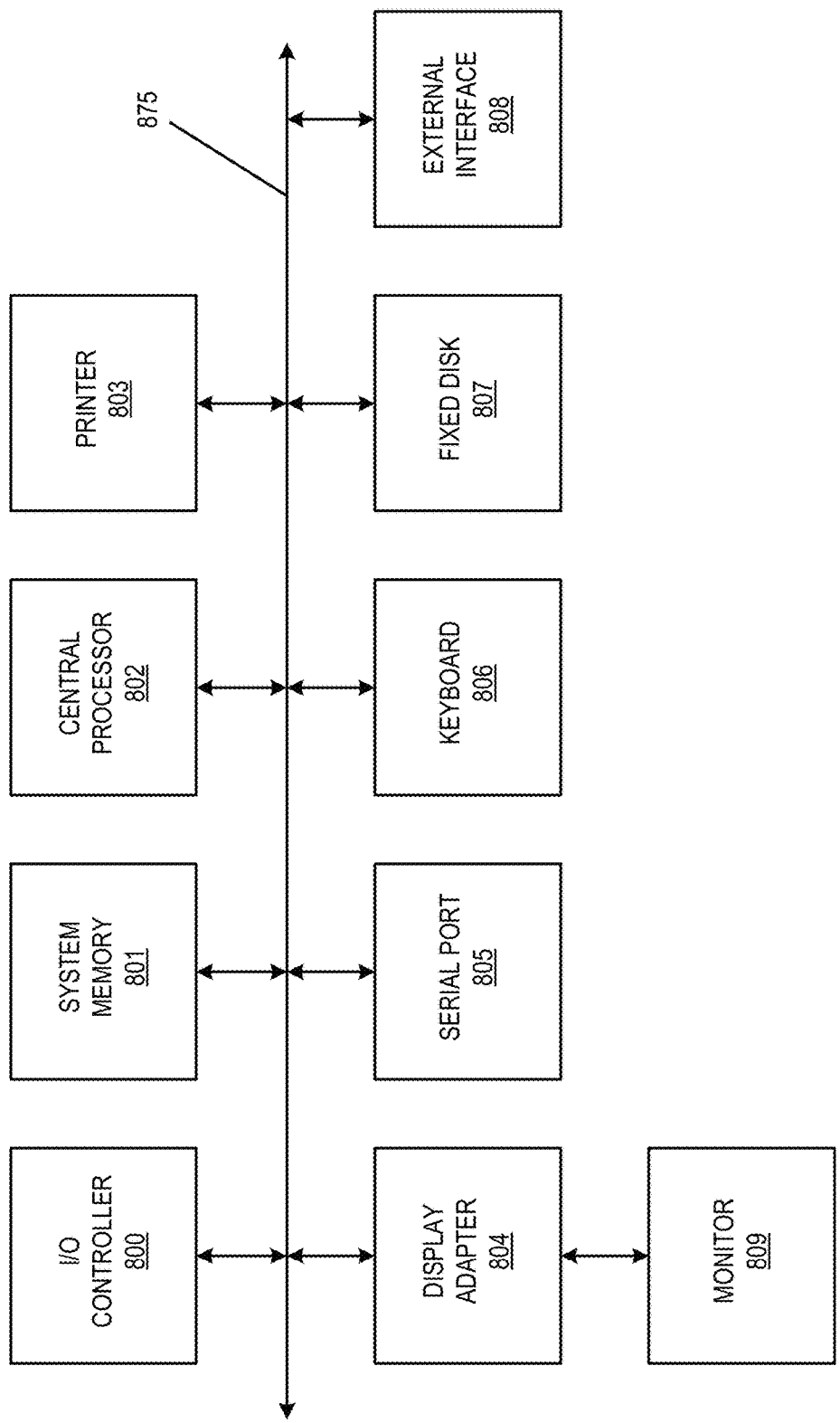
FIG. 8 shows a block diagram of a computer apparatus.

FIG. 8 is a high level block diagram of a computer system that may be used to implement any of the entities or components described above. The subsystems shown in FIG. 8 are interconnected via a system bus 875. Additional subsystems include a printer 803, keyboard 806, fixed disk 807, and monitor 809, which is coupled to display adapter 804. Peripherals and input/output (I/O) devices, which couple to I/O controller 800, can be connected to the computer system by any number of means known in the art, such as a serial port. For example, serial port 805 or external interface 808 can be used to connect the computer apparatus to a wide area network such as the Internet, a mouse input device, or a scanner. The interconnection via system bus 875 allows the central processor 802 to communicate with each subsystem and to control the execution of instructions from system memory 801 or the fixed disk 807, as well as the exchange of information between subsystems. The system memory 801 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A transaction analytics system comprising:
   one or more processors; and
   a non-transitory computer-readable storage medium comprising code executable by the one or more processors for implementing a method comprising:
      receiving, via a network interface, a scoring request associated with a transaction;
      sending the scoring request to a plurality of scoring models, including a production mode, that are executing from system memory of the one or more processors, wherein each scoring model generates a transaction score in response to the scoring request and is implemented using a different virtual machine of a plurality of virtual machines, wherein each of the plurality of scoring models is associated with a virtual IP address of a plurality of virtual IP addresses in the system memory, and wherein the virtual IP address associated with each scoring model is used by the one or more processors to determine a destination of the corresponding transaction score generated by the corresponding scoring model;
      receiving a first transaction score generated by the production model associated with a first virtual IP address of the plurality of virtual IP addresses;
      using the first virtual IP address to identify the destination of the first transaction score as a server that approves or denies the transaction;
      sending the first transaction score to the server for approval or denial of the transaction; and
      swapping the first virtual IP address that is associated with a first scoring model with a second virtual IP address that is associated with a second scoring model to promote the second scoring model to be the production model.

2. The transaction analytics system of claim 1, wherein the plurality of scoring models includes a testing model, and wherein a transaction score generated by the testing model is stored in a testing database.

3. The transaction analytics system of claim 1, further comprising:
   determining performance data for the scoring models in the plurality of scoring models;
   determining that a model other than the production model is the best performing model; and
   promoting the best performing model to be the production model.

4. The transaction analytics system of claim 3, wherein promoting the best performing model comprises modifying a virtual IP address associated with the virtual machine implementing the best performing model.

5. The transaction analytics system of claim 3, wherein the performance data comprises at least one of: a model's predictive accuracy, a model's computational efficiency, and a model's stability.

6. The transaction analytics system of claim 3, wherein the performance data is used to update at least one of the plurality of scoring models.

7. The transaction analytics system of claim 3, wherein determining performance data for the scoring models is performed at regular time intervals.

8. The transaction analytics system of claim 1, wherein the scoring request comprises a client identifier, wherein the method further comprises determining that a model in the plurality of scoring models is the production model corresponding to the client identifier.

9. A system comprising:
transaction analytics system of claim 1; and
a computer comprising:
    a second processor; and
    a second non-transitory computer-readable storage medium comprising code executable by the second processor for implementing a second method comprising sending the scoring request.

10. A computer-implemented method comprising:
receiving, by a computer, via a network interface, a scoring request associated with a transaction;
sending, by the computer, the scoring request to a plurality of scoring models, including a production mode, that are executed from system memory of the computer, wherein each scoring model generates a transaction score in response to the scoring request and is implemented using a different virtual machine of a plurality of virtual machines, wherein each of the plurality of scoring models is associated with a virtual IP address of a plurality of virtual IP addresses in the system memory, and wherein the virtual IP address associated with each scoring model is used by the computer to determine a destination of the corresponding transaction score generated by the corresponding scoring model;
receiving, by the computer, a first transaction score generated by the production model associated with a first virtual IP address of the plurality of virtual IP addresses;
using the first virtual IP address to identify the destination of the first transaction score as a server that approves or denies the transaction;
sending, by the computer, the first transaction score to the server for approval or denial of the transaction; and
swapping the first virtual IP address that is associated with a first scoring model with a second virtual IP address that is associated with a second scoring model to promote the second scoring model to be the production model.

11. The method of claim 10, wherein the plurality of scoring models includes a testing model, and wherein a transaction score generated by the testing model is stored in a testing database.

12. The method of claim 10, further comprising:
determining, by the computer, performance data for the scoring models in the plurality of scoring models;
determining, by the computer, that a model other than the production model is the best performing model; and
promoting, by the computer, the best performing model to be the production model.

13. The method of claim 12, wherein promoting the best performing model comprises modifying a virtual IP address associated with the virtual machine implementing the best performing model.

14. The method of claim 12, wherein the performance data comprises at least one of: a model's predictive accuracy, a model's computational efficiency, and a model's stability.

15. The transaction analytics system of claim 3, wherein the performance data is used to update at least one of the plurality of scoring models.

16. The method of claim 12, wherein determining performance data for the scoring models is performed at regular time intervals.

17. The method of claim 10, wherein the scoring request comprises a client identifier, wherein the method further comprises determining, by the computer, that a model in the plurality of scoring models is the production model corresponding to the client identifier.

18. The transaction analytics system of claim 1, the method further comprising;
subsequent to swapping the first virtual IP address with the second virtual IP address:
    receiving a subsequent scoring request;
    sending the subsequent scoring request to the second scoring model;
    receiving a second transaction score generated by the second scoring model acting as the production model; and
    sending the second transaction score to the server for approval or denial of the transaction.

19. The method of claim 10, further comprising:
subsequent to swapping the first virtual IP address with the second virtual IP address:
    receiving a subsequent scoring request;
    sending the subsequent scoring request to the second scoring model;
    receiving a second transaction score generated by the second scoring model acting as the production model; and
    sending the second transaction score to the server for approval or denial of the transaction.

* * * * *

UNITED STATES PATENT AND TRADEMARK OFFICE
CERTIFICATE OF CORRECTION

PATENT NO.       : 9,898,741 B2
APPLICATION NO.  : 14/334504
DATED            : February 20, 2018
INVENTOR(S)      : Kevin Siegel et al.

It is certified that error appears in the above-identified patent and that said Letters Patent is hereby corrected as shown below:

In the Claims

In Column 14, Claim 1, Line 15 replace "a production mode," with -- a production model, --

In Column 15, Claim 10, Line 19 replace "a production mode," with -- a production model, --

Signed and Sealed this
Tenth Day of April, 2018

Andrei Iancu
*Director of the United States Patent and Trademark Office*